S. SHIMAMOTO & T. INOUYE.
PULLEY.
APPLICATION FILED JUNE 10, 1916.
1,233,814.
Patented July 17, 1917.
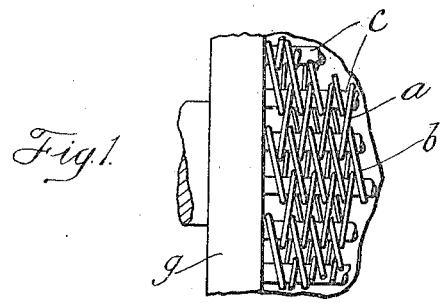
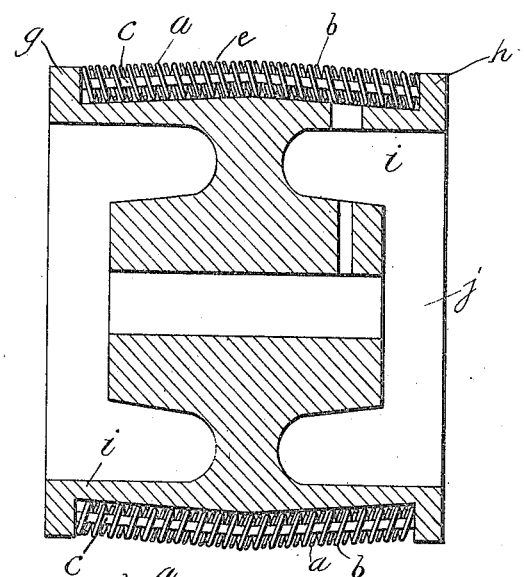
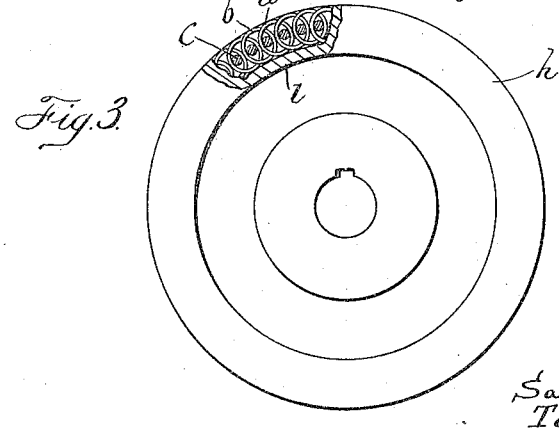
INVENTORS
Saichi Shimamoto
Tora Inouye
BY
Lewis J. Doolittle
ATTORNEY

UNITED STATES PATENT OFFICE.

SAICHI SHIMAMOTO AND TORA INOUYE, OF TOKYO, JAPAN.

PULLEY.

1,233,814.     Specification of Letters Patent.     Patented July 17, 1917.

Application filed June 10, 1916. Serial No. 102,810.

*To all whom it may concern:*

Be it known that SAICHI SHIMAMOTO and TORA INOUYE, subjects of the Emperor of Japan, both residing at Tokyo, Japan, have invented new and useful Improvements in Pulleys, of which the following is a specification.

Our invention relates to a pulley for power transmission in general consisting in covering its rim with an endless spring plate composed of a right-hand helical spring, a left-hand helical spring alternately interlaced, and steel wires or wire ropes passing through all the interstices formed by the interlacing, and rigidly securing the spring plate thus formed at both ends of the rim by means of soldering.

The invention will be fully disclosed in the following specification and claim.

Figure 1 represents a fragmental elevation of our improved pulley covered with a spring plate at its rim, Fig. 2, is a sectional view of the Fig. 1.

Fig. 3 is an end view, partly broken away, of the pulley.

Referring to the drawings and the letters thereon, $a$ indicates a right-hand helical spring, $b$, a left-hand helical spring, $c$, steel wire or wire ropes, and $g$ and $h$, the flanged parts of the rim of a pulley $j$.

In carrying the invention into practical effect, right-hand helical springs, $a$, and left-hand helical springs, $b$, are alternately interlaced, and are made into a rigid plate by steel wires or wire ropes, $c$, passing through the interstices. This spring plate, $e$, is rigidly embraced on the rim, $i$, of the pulley and is secured thereto at both ends by soldering.

It is well known by our experiences that the damage of a belt is owing to frictional heat due to the churning of the air by the rim when pulleys run at a high speed. The cushion of air being got rid of in our invention, the durability of the belt, especially of a leather belt, is exceedingly increased, which would effect great economy.

Claim:

A pulley having a flanged rim covered with an endless spring plate of woven steel wire or wire rope comprising a right-hand helical steel spring, a left-hand helical spring alternately interlaced, and steel wire or wire rope passing through all the interstices thus formed, said spring plate being embraced at the flanged ends of the rim and secured thereto by means of soldering, substantially as hereinbefore described.

In testimony whereof we have signed our names to this specification in the presence of two subscribing witnesses.

SAICHI SHIMAMOTO.
TORA INOUYE.

Witnesses:
   GENJI KURIBARA,
   KWAN NISHIMOTO.

Copies of this patent may be obtained for five cents each, by addressing the "Commissioner of Patents, Washington, D. C."